US008446373B2

(12) United States Patent
Day

(10) Patent No.: US 8,446,373 B2
(45) Date of Patent: May 21, 2013

(54) METHOD AND APPARATUS FOR EXTENDED ADJUSTMENT BASED ON RELATIVE POSITIONING OF MULTIPLE OBJECTS CONTEMPORANEOUSLY IN A SENSING REGION

(75) Inventor: Shawn P. Day, San Jose, CA (US)

(73) Assignee: Synaptics Incorporated, Santa Clara, CA (US)

( * ) Notice: Subject to any disclaimer, the term of this patent is extended or adjusted under 35 U.S.C. 154(b) by 977 days.

(21) Appl. No.: 12/247,048

(22) Filed: Oct. 7, 2008

(65) Prior Publication Data
US 2009/0201261 A1  Aug. 13, 2009

Related U.S. Application Data

(60) Provisional application No. 61/027,284, filed on Feb. 8, 2008.

(51) Int. Cl.
G06F 3/041 (2006.01)
G06F 3/033 (2006.01)
G09G 5/00 (2006.01)

(52) U.S. Cl.
USPC ............ 345/173; 345/156; 715/863; 715/864

(58) Field of Classification Search
USPC .................................................. 345/173, 156
See application file for complete search history.

(56) References Cited

U.S. PATENT DOCUMENTS

| 5,327,161 A * | 7/1994 | Logan et al. ............... 345/157 |
| 5,543,590 A | 8/1996 | Gillespie et al. |
| 5,543,591 A | 8/1996 | Gillespie et al. |
| 5,825,352 A | 10/1998 | Bisset et al. |
| 5,880,411 A | 3/1999 | Gillespie et al. |
| 5,889,236 A | 3/1999 | Gillespie et al. |

(Continued)

FOREIGN PATENT DOCUMENTS

| CN | 101052939 A | 10/2007 |
| CN | 101198925 A | 6/2008 |

(Continued)

OTHER PUBLICATIONS

Multi-Touch Systems That I Have Known and Loved, Bill Buxton, Microsoft Research, updated on Oct. 9, 2009, retreived on Dec. 9, 2009; URL: http://www.billbuxton.com/multitouchOverview.html.

(Continued)

Primary Examiner — Bipin Shalwala
Assistant Examiner — Benyam Ketema
(74) Attorney, Agent, or Firm — Ingrassia Fisher & Lorenz P.C.

(57) ABSTRACT

A touch sensor device and method is provided that facilitates improved device usability. Specifically, the device and method provide improved user interface functionality by facilitating extended parameter adjustment using proximity sensor devices. The device includes a processing system and a sensor adapted to detect objects in a sensing region. The device is adapted to provide user interface functionality by determining a measurement descriptive of a location of a first object relative to a location of a second object, and applying a first rate for adjusting a visual parameter such that the visual parameter adjusts even if the first object is stationary relative to the second object, where the first rate is based on the measurement. By so providing a first rate for adjusting a parameter, the device facilitates extended user input.

34 Claims, 7 Drawing Sheets

U.S. PATENT DOCUMENTS

| | | | |
|---|---|---|---|
| 5,943,052 A | 8/1999 | Allen et al. | |
| 6,958,749 B1 * | 10/2005 | Matsushita et al. | 345/175 |
| 7,030,861 B1 * | 4/2006 | Westerman et al. | 345/173 |
| 7,138,983 B2 * | 11/2006 | Wakai et al. | 345/173 |
| 7,469,381 B2 * | 12/2008 | Ording | 715/702 |
| 7,658,675 B2 | 2/2010 | Hotta | |
| 2006/0025018 A1 * | 2/2006 | Dube et al. | 439/628 |
| 2006/0025218 A1 * | 2/2006 | Hotta | 463/37 |
| 2006/0026521 A1 | 2/2006 | Hotelling et al. | |
| 2006/0031786 A1 * | 2/2006 | Hillis et al. | 715/863 |
| 2006/0033721 A1 | 2/2006 | Woolley et al. | |
| 2006/0097991 A1 | 5/2006 | Hotelling et al. | |
| 2006/0274046 A1 | 12/2006 | Hillis et al. | |
| 2007/0046643 A1 | 3/2007 | Hillis et al. | |
| 2007/0103452 A1 | 5/2007 | Wakai et al. | |
| 2007/0130547 A1 | 6/2007 | Boillot | |
| 2007/0236475 A1 | 10/2007 | Wherry | |
| 2007/0262951 A1 * | 11/2007 | Huie et al. | 345/156 |
| 2008/0036743 A1 | 2/2008 | Westerman et al. | |
| 2008/0309632 A1 * | 12/2008 | Westerman et al. | 345/173 |

FOREIGN PATENT DOCUMENTS

| | | |
|---|---|---|
| JP | 2001-134382 | 5/2001 |
| JP | 2001-290585 | 10/2001 |
| JP | 2002-091649 | 3/2002 |
| JP | 2002-311820 | 10/2002 |
| WO | 03088202 | 10/2003 |
| WO | 2007149357 | 12/2007 |
| WO | 2008001202 | 1/2008 |

OTHER PUBLICATIONS

International Search Report, PCT/US2009/059685 dated Aug. 5, 2010.

Dean Harris Rubine, "The Automatic Recognition of Gestures," CMU-CS-91-202, Dec. 1991, 285 pages.

Paul Dietz et al., "DiamondTouch: A Multi-User Touch Technology," ACM 2001, 1-58113-438, pp. 219-226.

Jun Rekimoto, "SmartSkin: An Infrastructure for Freehand Manipulation on Interactive Surfaces," CHI 2002, Apr. 20-25, 2002, Minneapolis, MN, pp. 113-120.

Dean Rubine, "Combining Gestures and Direct Manipulation," CHI 1992, pp. 659-660.

Wayne Westerman, "Hand Tracking, Finger Identification, and Chordic Manipulation on a Multi-Touch Surface," Dissertation submitted to the Faculty fof the University of Delaware, 1999, 363 pages.

Mike Wu et al., "Multi-Finger and Whole Hand Gestural Interaction Techniques for Multi-User Tabletop Displays," ACM 2003 1-58113-636-06/03/0010, pp. 193-202.

International search report for PCT/US2009/033540 dated Apr. 4, 2010.

USPTO "Notice of Allowance" mailed Jan. 11, 2012; U.S. Appl. No. 12/391,011, filed Feb. 23, 2009.

State Intellectual Property Office, P.R. China. Chinese Office Action dated Feb. 1, 2013 for Application No. 200980152829.0.

\* cited by examiner

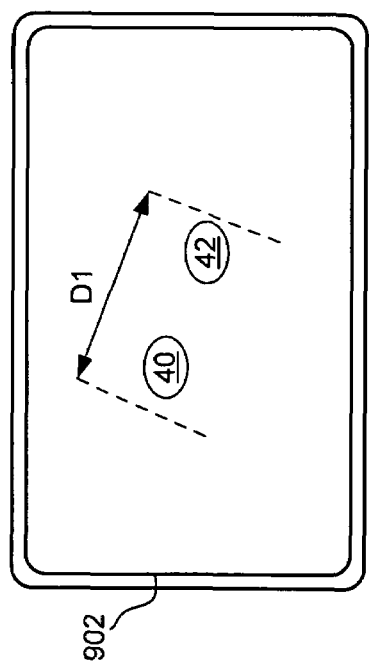
FIG. 15
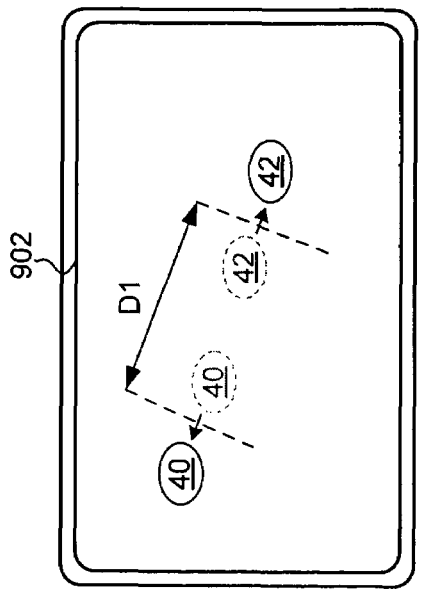
FIG. 16
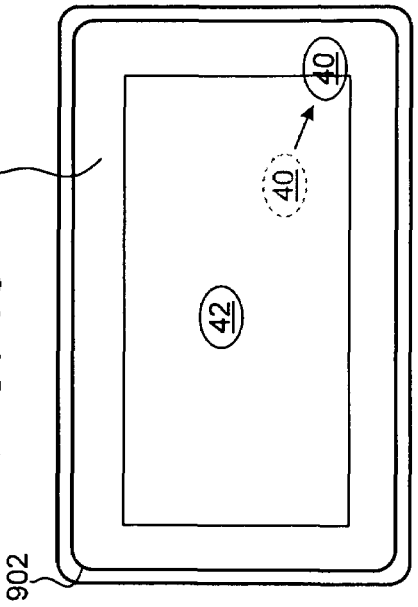
FIG. 17
FIG. 18

METHOD AND APPARATUS FOR EXTENDED ADJUSTMENT BASED ON RELATIVE POSITIONING OF MULTIPLE OBJECTS CONTEMPORANEOUSLY IN A SENSING REGION

PRIORITY DATA

This application claims priority to U.S. Provisional Patent Application Ser. No. 61/027,284, filed on Feb. 8, 2008, which is incorporated herein by reference.

FIELD OF THE INVENTION

This invention generally relates to electronic systems, as well as user interfaces and input devices associated with electronic systems.

BACKGROUND OF THE INVENTION

Proximity sensor devices (also commonly called touch pads or touch sensor devices) are widely used in a variety of electronic systems. A proximity sensor device typically includes a sensing region, often demarked by a surface, in which input objects can be detected. The proximity sensor device can utilize capacitive, resistive, inductive, optical, acoustic and/or other technology.

The proximity sensor device can be configured for inputting to an associated electronic system. For example, proximity sensor devices are often used as input devices for larger systems, including notebook computers and desktop computers. Proximity sensor devices are also often used in smaller systems, including handheld systems such as personal digital assistants (PDAs), cameras, and remote controls, and communication systems such as wireless telephones and text messaging systems. Increasingly, proximity sensor devices are used in media systems, including players and recorders for pictures, music, or video. In these applications the proximity sensor device can function as a value adjustment device, cursor control device, selection device, scrolling device, graphics/character/handwriting input device, menu navigation device, gaming input device, button input device, keyboard and/or other input device.

One common application for a proximity sensor device is as a touch screen. In a touch screen, the sensor of the proximity sensor device is used in conjunction with a display screen that displays images including graphics, text, combination of graphics and text, and the like. Together, the proximity sensor and display screen function to provide a touch screen interface.

One issue in the design of such electronic systems is facilitating the adjustment of parameters, such as scrolling or rotating of images and changing of volume. Traditional methods of adjustment used for proximity sensors can be difficult—often requiring many repetitive adjustment inputs such as repeated user input motions. This difficulty is especially evident in proximity sensor devices with relatively smaller sensing regions, where even greater numbers of adjustment input motions are often needed to cause same amounts of total adjustment.

Thus, there exists a need for improvements in user interfaces of electronic systems, and in particular for improvements in the ease of adjusting parameters of the electronic systems.

BRIEF SUMMARY OF THE INVENTION

The embodiments of the present invention provide a device and method that facilitates improved device usability. Specifically, the device and method provide improved user interface functionality by facilitating extended parameter adjustment using proximity sensor devices. The device includes a processing system and a sensor adapted to detect objects in a sensing region. The device is adapted to provide user interface functionality by determining a measurement descriptive of a location of a first object relative to a location of a second object, and applying a first rate for adjusting a visual parameter such that the visual parameter adjusts even if the first object is stationary relative to the second object, where the first rate is based on the measurement. By so providing a first rate for adjusting a parameter, the device facilitates extended user input. The extended user input is particularly useful for indicating continuing adjustments, for example, to facilitate scrolling or zooming through a large document, or changing a value over a large range of possible values.

The method is implemented to improve user interface functionality by facilitating parameter adjustment using a proximity sensor. The method includes the steps of sensing a first object and a second object contemporaneously in a sensing region, and determining a measurement descriptive of a location of the first object relative to a location of the second object. The method further includes the step of providing a first rate for adjusting a visual parameter such that the visual parameter adjusts even if the first object is stationary relative to the second object, where the first rate is based on the measurement. By so providing a first rate for adjusting a parameter, the method facilitates extended user input. The method is particularly useful for indicating continuing adjustments, for example, to facilitate scrolling or zooming through a large document, or changing a value over a large range of possible values.

BRIEF DESCRIPTION OF DRAWINGS

The preferred exemplary embodiment of the present invention will hereinafter be described in conjunction with the appended drawings, where like designations denote like elements, and:

FIGS. 4-18 are top views of sensor devices in accordance with the embodiments of the invention.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
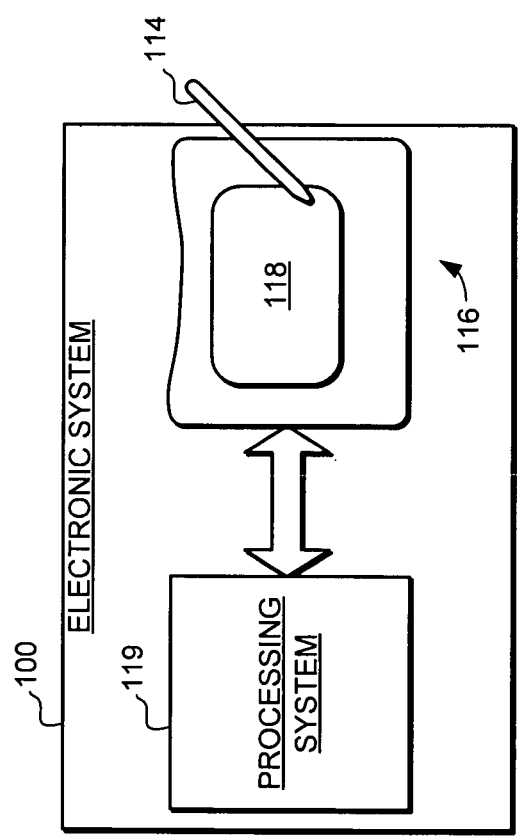
FIG. 1 is a block diagram of an exemplary system that includes a sensor device in accordance with an embodiment of the invention.

The embodiments of the present invention provide a device and method that facilitates improved device usability. Specifically, the device and method provide improved user interface functionality by facilitating extended parameter adjustment using proximity sensors. Turning now to the drawing figures, FIG. 1 is a block diagram of an exemplary electronic system 100 that is coupled to a sensor 116. As will be discussed in greater detail below, the sensor 116 is part of a proximity sensor device that can be implemented to support a user interface for the electronic system 100.

The term "electronic system" as used in this application broadly refers to any type of electronic device that operates with the proximity sensor device having sensor 116, and could be a slave to the proximity sensor device. The electronic system 100 could thus physically contain the proximity sensor device, or be physically separate from and electrically coupled to the proximity sensor device. As non-limiting examples, the electronic system 100 could comprise stationary or portable devices such as workstations, laptops, personal digital assistants (PDAs), video game players, communication devices (e.g., wireless phones and messaging devices), media recorders and players (e.g., televisions, cable boxes, video cameras, still cameras, music players, and video players), and other devices capable of accepting input from a user and of processing information. In some cases, the electronic system 100 is itself a peripheral to a larger system. For example, the electronic system 100 could be a data input device such as a remote control, external mouse, or external keyboard. As another example, electronic system 100 can be a data output device such as a display device or a printer. As yet another example, electronic system 100 can be an input-output device such as a combination scanner/printer.

Accordingly, the various embodiments of electronic system 100 may include any type and any number of processors, memory modules, or displays as appropriate. Further, the various elements (any processors, memory modules, etc.) of the electronic system 100 could be implemented as part of the proximity sensor device, as part of a larger system, or a combination thereof. Similarly, the proximity sensor device could thus be implemented as part of the electronic system 100, or coupled to the electronic system 100 using any suitable technique. The elements of electronic system 100 may communicate via any combination of protocols and connections, including buses, networks, and other wired or wireless interconnections. Non-limiting examples include I2C, SPI, PS/2, USB, Bluetooth, RF, and IRDA.

As discussed, sensor 116 is part of a proximity sensor device. The proximity sensor device has a sensing region 118 supported by sensor 116, and is controlled by a processing system 119. Sensor 116 is sensitive to input by one or more input objects in the sensing region 118. Example input objects include styli and fingers, and a stylus 114 is shown in FIG. 1 as a representative.

"Sensing region" as used herein is intended to broadly encompass any space above, around, in and/or near the supporting sensor where the sensor is able to detect an input object. In a conventional embodiment, the sensing region extends from a surface in one or more directions into space until the noise and decreased signal prevent accurate object detection. This distance may vary significantly with the type of sensing technology used and the accuracy desired, and may range from less than a millimeter to more than centimeters. Thus, some embodiments of the sensor may require input object contact with a surface associated with the sensor, while other embodiments may not. Accordingly, the size, shape and exact locations of particular sensing regions can vary widely among embodiments.

Taking capacitive proximity sensor devices as an example, the three-dimensional shape of the sensing region of a capacitive proximity sensor device is defined by factors such as sensor electrode design, sensor circuitry and sensing methodology, shielding, operating environment, required accuracy and resolution, and the like. Thus, although sensing regions which appear rectangular when projected onto a two-dimensional plane (e.g., sensing region 118 as projected onto the plane of FIG. 1) are common for capacitive proximity sensors, projections of other shapes are readily available.

In addition, proper sensor design, shielding, signal manipulation, etc. can effectively create a sensing region that extends a short or a long distance in the third dimension (e.g., into out of the page in FIG. 1). With a sensing region that extends almost no distance from an associated surface of the proximity sensor device, input may be recognized and acted upon when there is physical contact between any input objects and the associated surface and ignored when there is no contact. Alternatively, the sensing region may be made to extend a long distance, such that an input object positioned some distance away from a defined surface of proximity sensor device may still be recognized and acted upon. Therefore, interaction with a proximity sensor device may be either through touch-level proximity or through non-contact proximity.

In operation, sensor 116 suitably detects one or more input objects in the sensing region 118 and uses any number of techniques or structures to do so. As several non-limiting examples, the sensor 116 can use capacitive, resistive, inductive, acoustic, optical, or other techniques. Many of these techniques are advantageous to ones requiring moving mechanical structures (e.g. mechanical switches) that more easily wear out over time. In a common capacitive implementation, a voltage or current is applied to create an electric field about a surface. A capacitive sensor would then detect an object by detecting changes in capacitance reflective of changes in the electric field caused by the object. In a common resistive implementation, a flexible first substrate and a rigid second substrate carry uniform conductive layers that face each other. The conductive layers are separated by one or more spacers, and a voltage gradient is created across one or both layers during operation. Pressing the flexible first substrate with an object causes electrical contact between the conductive layer on the first substrate and the conductive layer on the second substrate. The voltage output then indicates the position of the contact, and thus the position of the object. In a common inductive implementation, one or more sensor coils pick up loop currents induced by one or more resonating coils. Examination of the resulting signal—e.g. its magnitude, phase, frequency, or combination thereof—produces information about the position, motion, or the like of the input object. Examples of the types of technologies that can be used to implement the various embodiments of the invention can be found at U.S. Pat. Nos. 5,543,591, 6,259,234 and 5,815,091, each assigned to Synaptics Inc.

Any number of sensors and sensor technologies can be included to support one or more sensing regions in a proximity sensor device. For example, the proximity sensor can use arrays of capacitive sensor electrodes to support any number of sensing regions. As another example, the proximity sensor device can use capacitive sensing technology in combination with resistive sensing technology to support the same sensing region, overlapping sensing regions, or physically separate sensing regions.

In some embodiments, the proximity sensor device including sensor 116 is implemented with separate buttons or other input devices near the sensing region 118 to provide additional input functionality to the proximity sensor device including sensor 116. Separate buttons can be implemented to provide additional input functionality to the proximity sensor device, such as to facilitate selection of items using the sensor 116. Of course, this is just one example of how additional input functionality can be added to the proximity sensor device having sensor 116. Conversely, the sensor 116 can be implemented with no additional input devices.

In some embodiments, the sensor 116 is adapted as part of a touch screen interface. Specifically, the sensor is combined with a display that is overlapped by at least a portion of the sensing region 118. Together, the sensor 116 and the display provide a touch screen for interfacing with the electronic system 100. The display can be any type of electronic display capable of displaying a visual interface to a user, and can include any type of LED (including organic LED (OLED)), CRT, LCD, plasma, EL or other display technology. When so implemented, input received through the sensor 116 can be used to activate functions on the electronic system 100 as indicated by the electronic display, such as by allowing a user to select a function by placing an object in the sensing region proximate an icon or other user interface element that is associated with or otherwise identifies the function.

It should also be understood that the different parts of the overall device can share physical elements extensively. For example, some display and proximity sensing technologies can utilize the same electrical components for displaying and sensing. One implementation can use an optical sensor array embedded in the TFT structure of LCDs to enable optical proximity sensing through the top glass of the LCDs. Another implementation can incorporate capacitive sensor electrodes into display pixels to enable both display and sensing to be performed by substantially the same structures.

It should also be understood that while the embodiments of the invention has been, and will continue to be described herein the context of a fully functioning proximity sensor device, the mechanisms of the present invention are capable of being distributed as a program product in a variety of forms. For example, the mechanisms of the present invention can be implemented and distributed as a proximity sensor program on a computer-readable signal bearing media. Additionally, the embodiments of the present invention apply equally regardless of the particular type of computer-readable signal bearing media used to carry out the distribution. Examples of signal bearing media include: recordable media such as memory sticks/cards/modules and disk drives, which may use flash, optical, magnetic, holographic, or any other storage technology.

As shown in FIG. 1, the processing system 119 is coupled to the sensor 116 and the electronic system 100. In this specification, the term "processing system" includes any number of processing elements appropriate to perform the recited operations. Thus, the processing system 119 can comprise any number of discrete components, any number of integrated circuits, firmware code, and/or software code—whatever is needed to perform the recited operations. Furthermore, the processing system 119 can be physically separate from or physically integrated with parts of the electronic system 100. For example, the processing system 119 can reside at least partially on a microprocessor for performing functions for the electronic system 100 aside from implementing the proximity sensor device. In some embodiments, all processing elements that comprise the processing system 119 are located together, in or near the sensor 116. In other embodiments, these elements would be physically separated, with some elements of the processing system 119 close to sensor 116, and some elsewhere (such as near other circuitry for the electronic system 100). In this latter embodiment, minimal processing could be performed by the elements near the sensor 116, and the majority of the processing could be performed by the elements elsewhere.

The processing system 119 can perform a variety of processes on the signals received from the sensor 116 to implement the proximity sensor device. For example, the processing system 119 can select or connect individual sensor electrodes of sensor 116, determine presence, non-contact proximity, or contact, calculate position or motion, and recognize or interpret gestures. Further, the processing system 119 can provide an indication to an electronic system to report a particular input, or to cause feedback directly perceivable by users. The processing system 119 can also determine when certain types or combinations of object motion occur in the sensing region. For example, the processing system 119 can determine the direction in which an input object is moving when it lifts from a surface associated with the sensor 116, and can generate the appropriate indication in response to that motion.

Thus, the processing system 119 determines positional information related to one or more input objects. In some embodiments, processing system 119 further processes the positional information and provides electronic indicia based on the positional information to the electronic system 100. The system 100 then appropriately processes the indicia to accept inputs from the user, to move a cursor or other object on a display, or for any other purpose. With such embodiment, processing system 119 can report positional information to electronic system 100 constantly, when a threshold is reached, or in response some criterion such as an identified stroke of object motion. In other embodiments, the processing system 119 directly processes the indicia to accept inputs from the user, to move a cursor, a section of text, or other visual object on a display, or for any other purpose based on any number and variety of criteria.

The term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. For example, the processing system 119 can be implemented to use or provide "zero-dimensional" 1-bit positional information (e.g. present or not present near the sensor 116), or "one-dimensional" positional information as a scalar (e.g. along a path associated with sensing region 118). Processing system 119 can also be implemented to determine multi-dimensional positional information as a combination of values (e.g., "two-dimensional" in a projection of the sensing region 118 onto a plane, or "three-dimensional" information in 3-space. Theses may be expressed as components along horizontal/vertical/depth axes, angular/radial axes, or any other combination of axes that span the dimensions desired).

The positional information from the processing system 119 facilitates a full range of interface inputs, including use of the proximity sensor device for cursor control or an input device for adjustment. As specific examples, the processing system 119 can be configured to apply, or provide for applying, the first rate of adjustment to a parameter of a displayed image by scrolling the image, zooming the image, otherwise manipulating the image, or any combination thereof. It should be noted that when applying an adjustment to a parameter of the displayed image that the displayed image can comprise all or part, or a combination of displayed elements on a screen. Thus, the image parameter that is adjusted could apply to all elements or images of the entire display screen area, or to individual elements or images within the display screen area, such as graphical elements, textual elements, user interface elements, windows, etc. Furthermore, in embodiments configured for scrolling, either or both vertical and horizontal scrolling can result from the parameters adjusted.

In embodiments of the present invention, the sensor 116 is adapted to provide the ability for a user to easily cause adjustments in an electronic system using a sensor 116 as part of a user interface. For example, the sensor 116 can be used to facilitate user interface navigation, such as scrolling, panning, menu navigation, cursor control, and the like. As another example, it can be used to facilitate value adjustments associated with visual parameters, such as color, hue, brightness, and contrast. Alternatively, the sensor 116 can be used to adjust auditory parameters such as volume, pitch, and intensity, or to manipulate operation parameters such as speed and amplification. Other examples of non-visual parameters include olfactory or other sensory parameters. The sensor 116 can also be used for control of mechanical devices, such as in controlling the movement of a machine.

As more specific examples, the parameter can be a magnification level of an image, such that adjustments to the parameter result in zooming into or out of an image. The parameter can likewise be a rotational angle of an image, such that adjustments to the parameter result in clockwise or counter-clockwise rotation of an image (e.g., a picture or modeled object).

In the embodiments of the present invention, the sensor 116 provides improved user interface functionality by facilitating extended parameter adjustment using proximity sensors. Specifically, the sensor 116 and processing system 119 is adapted to provide user interface functionality by determining a measurement descriptive of a location of a first object relative to a location of a second object, and applying a first rate for adjusting a visual parameter such that the visual parameter adjusts even if the first object is stationary relative to the second object, where the first rate is based on the measurement. By so providing a first rate for adjusting a parameter, the sensor 116 facilitates extended user input in electronic systems. The extended user input is particularly useful for indicating continuing adjustments, for example, to facilitate scrolling through a large document, zooming in and out of a detailed picture, or changing a value over a large range of possible values.

Figure 2:
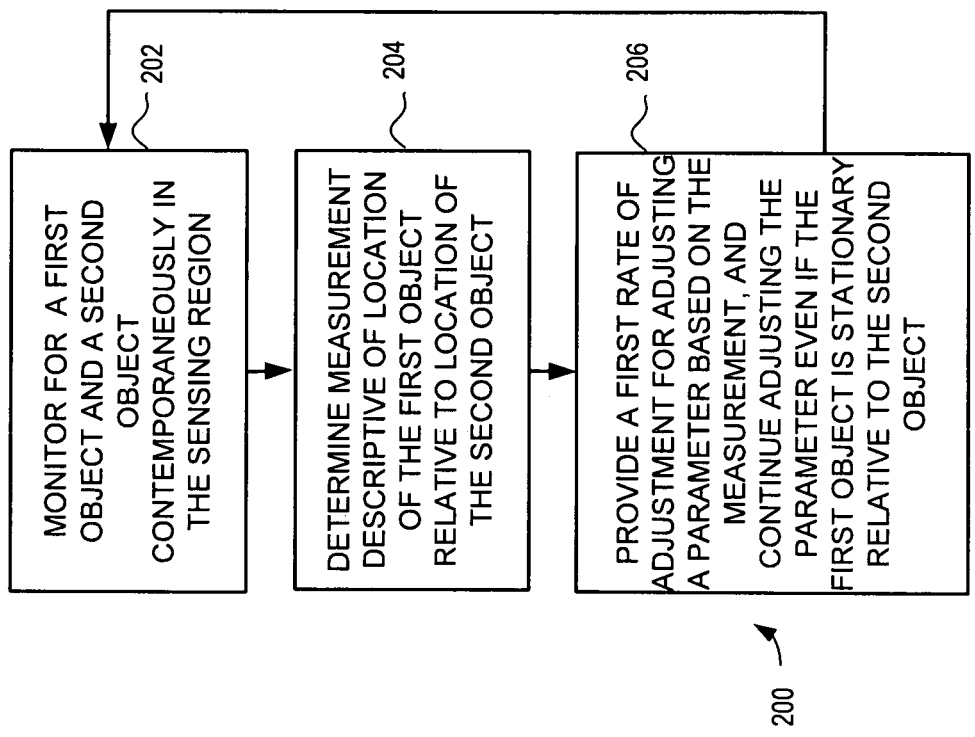
FIG. 2 is a flow diagram of a method for providing a first rate of adjustment in accordance with the embodiments of the invention.

Turning now to FIG. 2, a method 200 of producing an output using a proximity sensor device is illustrated. Although specific steps are disclosed in FIG. 2, such steps are examples. That is, some embodiments perform subsets or supersets of the steps or variations of the steps recited in FIG. 2. Further, the steps in FIG. 2 may be performed in an order different than presented. In general, the method 200 provides improved user interface functionality by facilitating extended parameter adjustment using proximity sensor devices. For example, the method allows a user to produce a variety of extended inputs such as zooming, scrolling, or rotating within a limited space on a sensor.

Figure 3:
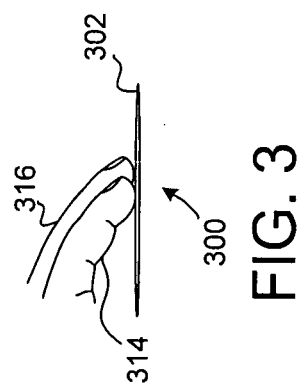
FIG. 3 is side view a sensor device in accordance with embodiments of the invention.

The first step 202 of method 200 is to monitor for a first object and a second object contemporaneously in the sensing region. As described above, the sensor can use any type sensing technology to determine if objects are in the sensing region, including capacitance-based sensing methods. In most systems, this step is performed frequently by the system, at a frequency determined by the processing system controlling the sensor. Turning to FIG. 3, a side view including a top surface 302 associated with a sensor 300 is illustrated, with two exemplary input devices, fingers 314 and 316, in the sensing region. These fingers 314 and 316 are examples of the type of objects that can be monitored for in the sensing region.

Returning to FIG. 2, the next step 204 is to determine a measurement descriptive of the location of the first object relative to the location of the second object simultaneously in the sensing region. As will be described in greater detail below, the measurement descriptive of relative location can comprise various different types of measurements. For example, the measurement can comprise a distance defined by the locations of the first object and the second object, such as the distance between determined centers of the first object and the second object. Alternatively, the measurement can comprise a direction defined by the location of the first object and the location of the second object. For example, the direction can be that of a vector pointing from the first object towards the second object, or vice versa. Such a direction can be measured as an angle relative to an appropriate reference frame (e.g. using a polar coordinate system with a defined zero angular direction, using a Cartesian coordinate system where direction aligned with the positive X-axis is considered zero and counter-clockwise angles from the X-axis are considered positive, etc.). As an alternate example, the direction can be measured as an angle defined by the two locations and a reference such as a line (e.g. the angle between a line intersecting the determined centers of the first and second objects and a reference line). The reference can also be made dynamic, and can be based off of factors such as previous input locations, initial locations, and the like. The reference can also be made user settable.

Furthermore, the measurement can comprise a combination of different quantities descriptive of the relative location. For example, the measurement can comprise a combination of both the distance between objects and the direction defined by the objects.

It should also be noted that, in many embodiments, the step of determining the measurement does not require that the actual positions of the objects be calculated, or the actual centers be determined. For example, the direction defined by the objects and/or the distance between the objects can be determined without explicitly calculating the position of each object. Some embodiments effectively use arbitrary choices among possible sets of positions for first and second object. In these embodiments, different sets of potential positions of the first and second objects exist, and a value for the measurement is determined from one or more of these sets of potential positions irrespective of if the potential positions are actual positions of the first and second objects. A specific example uses a capacitive profile-type sensor device with a sensor array containing sets of sensor electrodes aligned along orthogonal axes. Such a capacitive profile-type sensor effectively measures the total capacitive coupling of each of the sensor electrodes to input objects, such that two single axes profiles are generated to describe 2D locations of any number of objects in the sensing region. Thus, if a first input object and a second input object are placed near the sensor electrodes, it may be ambiguous from the profiles which of the potential positions of the first and second objects reflect the true positions of the objects. However, the distance between the potential positions are the same in both sets. Therefore, using the distance as the measurement would mean that the actual positions need not be determined.

Also, the relative location of the first object to the second object can stay substantially the same (such that the objects are substantially stationary relative to each other) even if the objects are moving with respect to another frame of reference. For example, if the first and second objects are moving through the sensing region with the same velocities, then the first and second objects would not be in motion relative to each other even though they would be in motion relative to the sensing region.

In any of these cases, step 204 determines the measurement descriptive of the relative location of the two objects. The next step 206 is to provide a first rate of adjustment based on the measurement, such that the affected parameter continues adjusting even if the first object is stationary relative to the second object. As stated above, the parameter adjusted can be any type.

The rate of adjustment can be determined based on the measurement in variety of ways. For example, the rate of adjustment may be a constant, a set of discrete values, or a continuously variable function over the measurement values (or at least as continuous as possible given the processing system, which may use digital rather than analog circuitry). The proximity sensor device can also use the measurement in a gating manner, such that measurements on one side of a threshold result in no rate of adjustment. The threshold can be determined in many different ways, and can vary based on initial locations, if the measurement is greater or less than prior measurements, if the measurement over time is generally increasing or decreasing, and the like. Further, a single proximity sensor device can support multiple thresholds, such that different ranges of measurements may result in rates of adjustment that are related to the measurement in different ways. In contrast, some embodiments use no thresholds, and determine the rate as a discrete or continuous function based on the measurement without any gating criteria.

The rate can also be based in part on the difference between a measurement and a reference. The rate can be made variable, such as in a proportional manner, to the difference between the measurement and the reference. Depending on the implementation, such a reference can be determined at any appropriate time, including at manufacture, system startup, system calibration, and dynamically during use. For example, a dynamically determined reference can take into account previous user input such as initial locations (e.g., the locations associated with when the rate-defining adjustment input begins, the locations associated with when the objects first touch a surface associated with the sensing region, and the like).

Additionally, the rate can also be based on other factors, including other input factors such as the force associated with one or both of the objects in the sensing region, change in capacitance associated with the objects, or the duration of time that the objects are in the sensing region. Other viable input factors include prior measurements (such as those in a period of time shortly before the current measurement), user settable preferences, location of one or both objects, use history, active applications, parameter being adjusted, etc.

Regardless of the relationship between the measurement and the rate, on-the-fly calculations are not required. For example, look-up tables can be used to determine the rate of adjustment, instead of actual calculations.

It should be noted that step 206 results in continuing adjustment even if the first object is stationary relative to the second object. This is a result of applying a continuing rate of adjustment, with the rate determined at least in part by the measurement (e.g. the distance or angle), rather than simply applying a quantity of adjustment based solely on the change in the measurement (e.g. the change in distance or change in angle). This allows adjustment of the parameter to continue even if relative motion between the objects substantially ceases. Thus, in an embodiment where the rate of adjustment changes with the measurement, a user can control the rate of adjustment by moving the objects relative to each other in an appropriate way. When the desired rate is found, the user can also continue the adjustment at the desired rate by simply holding the objects on the sensor in substantially constant relative positions.

In some embodiments, when the desired adjustment is completed, the user can move one of the objects away from the sensor and the continued adjustment ceases. Specifically, the processing system can be configured to cease continued, rate-based adjustment of the parameter responsive to at least one of the first and second objects moving away from the sensing region. Some embodiments will accept removal of either object, while others will require a specific object (e.g. the first one to enter the sensing region, the leftmost one, etc.) to be removed. In contrast, the processing system can be configured to require both the first and second objects be removed from the sensing region before adjustment is ceased. Meanwhile, other embodiments require the user to provide some other input (e.g., pushing a key, introduction of another input object in the sensing region, etc.) to cease adjustment. These other inputs may be required in place of or in addition to removal of any input objects. Furthermore, the sensor can cease rate-based adjustment (which can be implemented by setting the rate portion of the adjustment to null or zero) by generating an appropriate stop signal, or by ending some type of continuing signal that was used to adjust the rate.

In another embodiment, the reversal of a direction of motion of the first object relative to the second object can be implemented to result in cessation of the continued adjustment. The system can be set to cease continued adjustment as close in time or space to the instant of reversal as possible, or some amount past the reversal. One way to monitor for reversal of the direction of motion of one object relative to another is to observe how the measurement changes over time. For example, if the measurement increases and then decreases, reversal likely occurred. The opposite is also true, such that if the measurement decreases and then increases, reversal likely occurred. Examining a first derivative of values of the measurement over time is another way to monitor for reversal. Where the first derivative changes polarity (e.g., switches from positive to negative, and vice versa), reversal has occurred.

Figure 4:
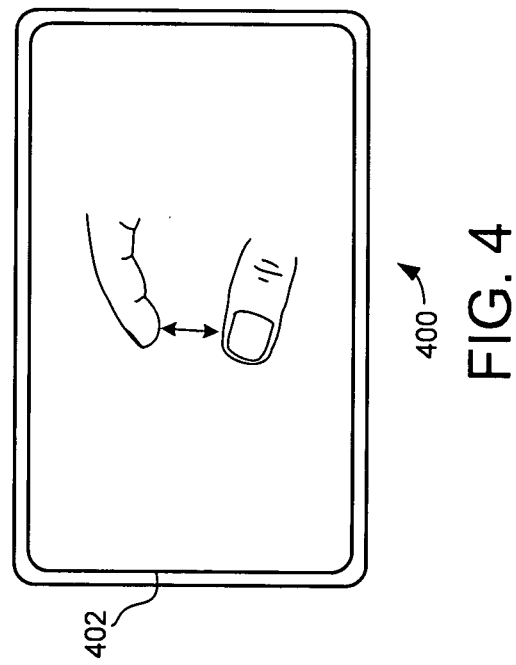

To give a specific example, the method 200 can be used to facilitate an "extended pinch" type function. Turning briefly to FIG. 4, a sensor 400 is illustrated showing two objects (shown as fingers) performing a pinching gesture in the sensing region 402. ("Pinching" is used here to include spreading input objects apart as well as bringing them closer to each other.) In this illustrated example, the distance between the two objects is calculated and used to determine a rate of adjustment. In some embodiments, as the distance between objects increases, the rate of the adjustment increases, and as the distance between objects decreases, the rate decreases. Other embodiments implement the reverse. Still other embodiments have constant values of increase or decrease. Thus, the user is able to zoom, scroll, or otherwise perform an adjustment through a "pinching" motion of the objects in the sensing region.

Figure 5:
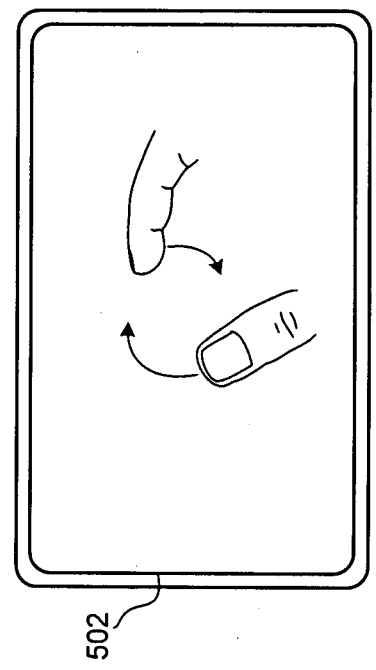

As another specific example, the method 200 can be used to facilitate an "extended rotate" type function. Turning briefly to FIG. 5, a sensor 500 is illustrated showing two fingers performing a rotating gesture in the sensing region 502. In this illustrated example, a direction defined by the locations of the two objects is calculated and used to determine the rate of adjustment. In some embodiments, as the direction (defined by the positions of the two objects) changes (e.g., as motion of one or both of the objects causes the direction to rotate), the rate of adjustment changes. Thus, the user is able to perform an adjustment by moving the objects in the sensing region.

In both of these specific examples, step 206 causes continued adjustment even if the first object is stationary with respect to the second object. Thus, in "extended pinch" embodiments used to control "zoom", step 206 may continue to apply a "zoom" adjustment even if relative motion of the pinching objects cease, with the rate of the zoom determined at least in part by the distance between the two objects. In an "extended pinch" embodiment that supports discretely or continuously variable rates of adjustment for "zooming," a user can thus increase or decrease the rate of the zoom by pinching the objects apart (i.e., "spreading") or pinching them together, and continue to zoom by simply holding both objects in the sensing region. This extended pinch behavior is not found in traditional pinch and rotate inputs that respond only to continued object motion, and do not continue any adjustment after relative object motion ceases.

It should be noted that other factors or inputs could also be used to determine the actual adjustment applied to the parameter. For example, the rate of adjustment based on the measurement could be included in an overall adjustment that includes other rates or quantities of adjustment gained from different inputs. In one embodiment, the system also applies quantities of adjustment based on the difference between a current measurement and a recently prior measurement; these quantities of measurement do not allow the system to continue adjustment where the relative positions of the objects stay the same. These quantities of adjustment can be added to the rate of adjustment to generate an overall adjustment that includes both factors.

As a specific "pinch" example, where the distance is within a range of distances about an initial distance, the system adjusts the zoom by applying a quantity of change to the zoom that is based on the difference between a current distance and a recent distance. Examples of the initial distance include when the pinching input first begins, the distance when the objects first touch a surface associated with the sensing region, and the like. For distances outside of that range, the system applies a rate of change to the zoom. Depending on the implementation, distance changes within that range may result only in changes in rate of zoom, additional quantities of zoom based on the change in distance, or both. An analogy is available for a rotational implementation.

Furthermore, as discussed above, the rate can have a variety of resolutions. For example, the rate may be binary, have multiple quantized options, or have infinitely variable options (such as with an analog scale).

Figure 7:
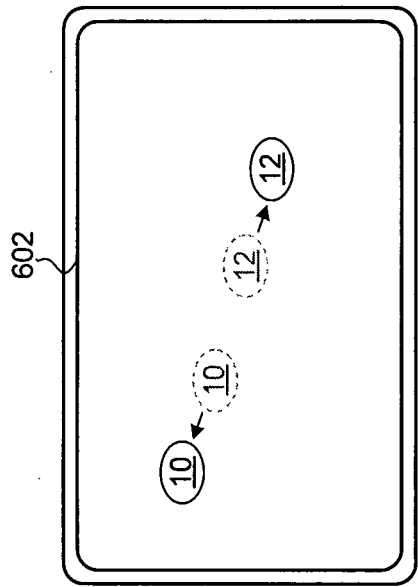
Figure 6:
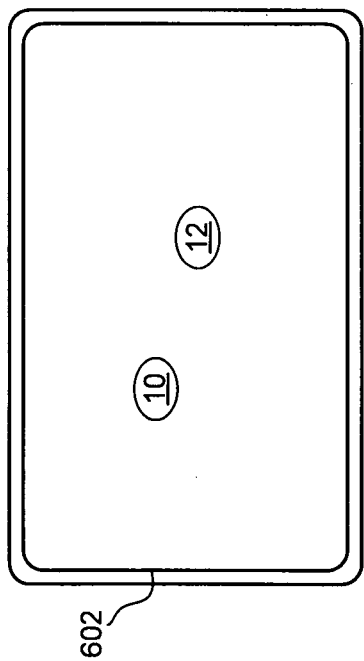

Turning now to FIGS. 6-9, a sensor 600 is illustrated that supports a sensing region 602. The sensor 600 is a part of a proximity sensor device that is associated with an electronic system (not shown). A top view of a surface associated with the sensing region 602 is shown in FIGS. 6-9. Inside the sensing region 602 is illustrated the presence of two objects 10 and 12. These two objects 10 and 12 are simplified representations of the types of objects that can be used with the sensor 600. In FIG. 6, the objects 10 and 12 are at a first location and a second location, respectively. FIG. 7 illustrates how the objects 10, 12 can be separated by a user, such that the distance between objects 10 and 12 increases. In accordance with an embodiment of the invention, this "spreading" of the objects causes a change in the rate of adjustment to be applied to a parameter. That is, an adjustment is applied at a rate that is determined, at least in part, by the measured distance between objects. Thus, as the measured distance changes, the rate of adjustment changes.

In one specific example, the processing system causes a displayed image on an associated display device to zoom in at a rate that has more than one possible value that is determined by the measured distance between objects. Thus, as the objects separate, the magnification level of the image increases at a faster rate. Depending on the implementation, the distance may need to differ from the initial distance by at least a threshold amount before the processing system causes a rate of zoom. Further, the rate of adjustment may be supplemented with quantities of adjustment determined by the immediate change in distance.

Figure 8:
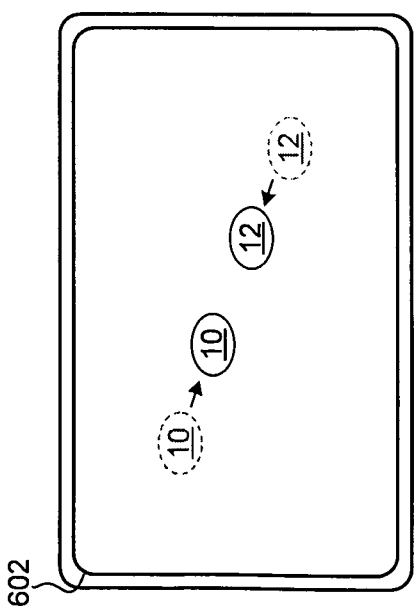

FIG. 8 illustrates how the objects can be brought together by the user such that the distance between objects decreases. Again, in accordance with an embodiment of the invention, this pinching of the objects together causes a rate of adjustment to the parameter. For example, the processing system causes the display to zoom out at a rate that is again determined at least in part by the measured distance between objects. Thus, in a specific embodiment with multiple values possible for the rate of adjustment, as the objects are brought closer, the processing system causes zooming of the image at faster rates. As with the "spreading", depending on the implementation, the distance may need to differ from the initial distance by at least a threshold amount before the processing system causes a rate of zoom. Further, the rate of adjustment may be supplemented with quantities of adjustment determined by the immediate changes in distance.

Figure 9:
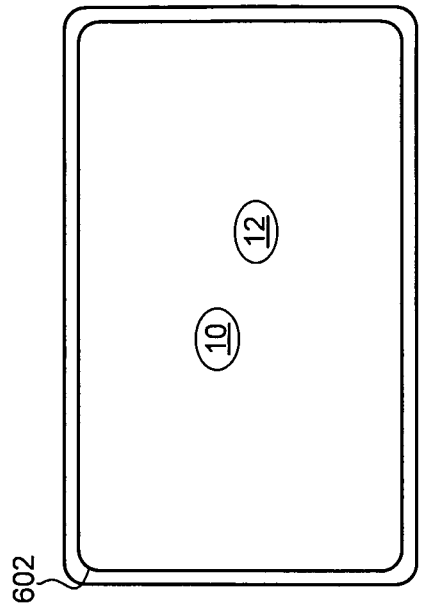

FIG. 9 illustrates how changes in the relative distance between the two objects can be ceased by the user, with both objects remaining in the sensing region. Although FIG. 9 shows the objects 10 and 12 as stationary, the objects 10 and 12 can be moved while keeping the distance between them unchanged. In response, the parameter continues to adjust at a determined rate, with the rate determined at least in part by the distance between the objects when the motion ceased. Thus this extended adjustment continues even after the objects stop moving. This is an example of a "rate-based" adjustment, where a change in the distance between objects does not simply result in a change to the parameter, it instead changes the rate at which the parameter is adjusted. Thus, in this embodiment, instead of stopping a zoom when object motion ceases (where a rate of adjustment is applied before object motion ceases), the processing system causes the zoom to continue at the rate determined by the final position of the objects until one or both of the objects is removed from the surface associated with the sensor 600.

Figure 10:
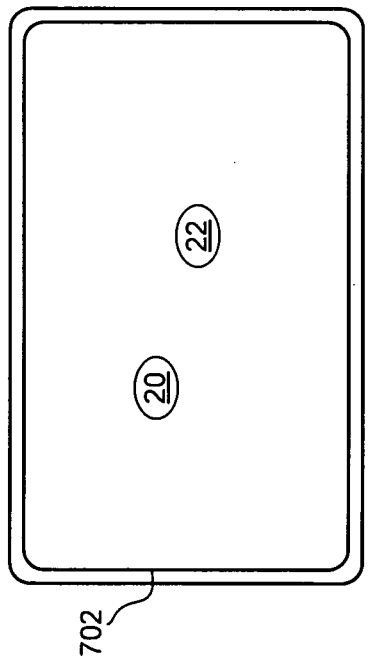
Figure 11:
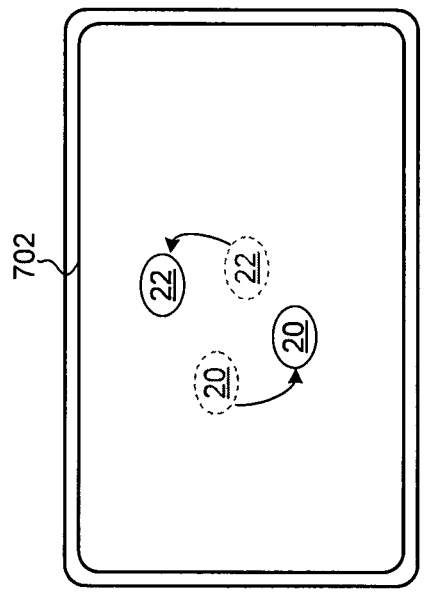

Turning now to FIGS. 10-13, a sensor 700 is illustrated that includes a sensing region 702. The sensor 700 is part of a proximity sensor device that is associated with an electronic system (not shown). A top view of a surface associated with the sensing region 702 is shown in FIGS. 10-13. Inside the sensing region 702 is illustrated the presence of two objects 20 and 22. For convenience of this explanation, the location of object 20 is referred to as the first location and the location of the object 22 is referred to as the second location, even though some implementations use the reverse convention. In FIG. 10, the objects 20 and 22 are at a first initial location and a second initial location, respectively. FIG. 11 illustrates how the objects 20 and 22 can be orbited around one or more virtual axes, or "revolved" by the user, such that the direction defined by the relative locations of the objects 20 and 22 changes. In accordance with an embodiment of the invention, this motion of the objects causes a change in the rate of adjustment applied to a parameter. That is, an adjustment is applied at a rate that is determined, at least in part, by the measured direction defined by the relative locations of the objects.

For a specific example, the processing system causes a displayed image on an associated display device to rotate at a rate that is determined by an angle defined by the locations of the objects and a reference. Thus, where multiple values are available for the rate, as the objects revolve counterclockwise and the magnitude of the angle increases, the processing system causes the displayed image to rotate counterclockwise at a faster rate. Depending on the implementation, the angle may need to differ from the initial angle by at least a threshold amount before the processing system causes a rate of adjustment. Further, the rate of adjustment may be supplemented with quantities of adjustment determined by the immediate changes in angle.

Figure 12:
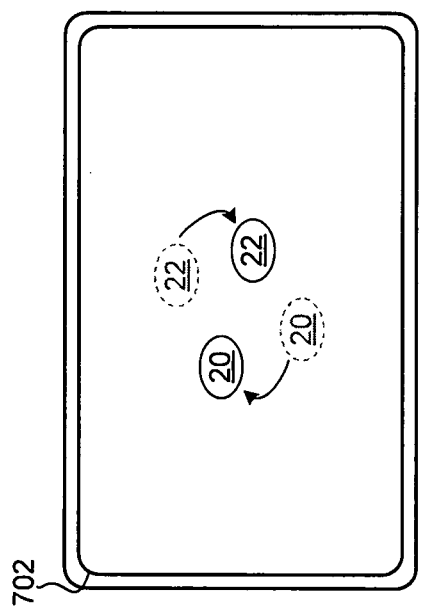

FIG. 12 illustrates how the objects can be revolved such that the direction defined by the locations of the objects changes in an opposing way to that shown in FIG. 11. If an angle is used to characterize the direction, then the angle would have changed in FIG. 12 in an opposing manner as compared to FIG. 11. In accordance with an embodiment of the invention, this revolution of the objects causes a change in the rate of adjustment applied to the parameter. For example, the processing system may cause the image to rotate at a rate that is again determined at least in part by an angle defined by the location of the objects. Thus, in a specific embodiment with multiple values possible for the rate of adjustment, as the objects revolve in the opposite direction, the processing system causes the displayed image to rotate counter-clockwise at a slower rate or to rotate clockwise at an increasing rate. Depending on the implementation, the angle may need to differ from the initial angle by at least a threshold amount before the processing system causes a rate of adjustment. Further, the rate of adjustment may be supplemented with quantities of adjustment determined by the immediate changes in angle.

Figure 13:
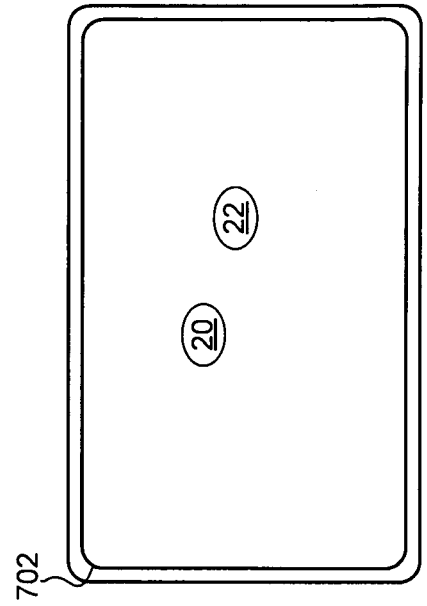

FIG. 13 illustrates how the object motion can be ceased by the user, with both objects remaining in the sensing region. Although FIG. 13 shows the objects 20, 22 as stationary, the objects 20, 22 can be moved while the angle defined by them does not change. Again, the adjustment continues at a determined rate, with the rate determined at least in part by the relative locations of the objects when the motion ceased. Thus, this extended adjustment continues even after the objects stop moving. This is another example of a rate-based adjustment, where a change in the direction defined by the objects does not simply result in a change to the parameter, but instead changes the rate at which the parameter is adjusted. Thus, in this embodiment, instead of stopping rotation when object motion ceases (where a rate of adjustment is applied before object motion ceases), the processing system cause the displayed image to continue to rotate at the rate determined by one or more previous directions until one or both of the objects is removed from the surface associated with the sensor 700.

Figure 14:
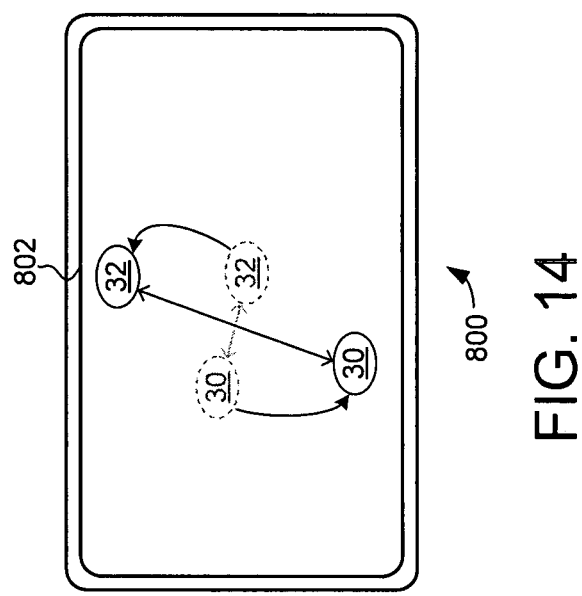

Turning now to FIG. 14, a sensor 800 is illustrated that includes a sensing region 802. FIG. 14 illustrates how two parameters can be simultaneously adjusted at two controlled rates. Specifically, the processing system controlling sensor 800 is adapted to cause a first rate of adjustment to a first parameter, with the first rate based on a distance between the objects, and is further adapted to cause a second rate of adjustment to a second parameter based on the direction defined by the objects (which may be defined as an angle in some embodiments). Thus, as the objects are separated (or brought together) the processing system causes a change in the first rate of adjustment to the first parameter. Likewise, as the objects revolve about one another or one or more axes, the processing system causes a change in the second rate of adjustment to the second parameter. As a user can change both the distance and the direction of the objects with one motion, sensor 800 can facilitate both adjustments at controlled rates with one motion.

Again, these adjustments can continue even after object motion ceases, and thus is an example where two rate-based adjustments are provided. Thus, instead of stopping adjustment when object motion ceases (where a rate of adjustment is applied before object motion ceases), the processing system causes one or both adjustments to continue until one or both of the objects is removed from the sensor.

As stated above, the type of adjustment discussed in conjunction with FIGS. 6-14 can be described as a rate-type adjustment. Because a rate-type adjustment continues even after object motion has ceased, it can be considered to have a time component that does not exist in non-rate-type adjustments. Thus, a rate-type adjustment to a parameter has a time component that allows adjustment at a controlled rate, even in response to an unchanging input.

One example of a common rate-type input device is a typical isometric joystick (sometimes also termed a pointing stick or a TRACKPOINT device) found in some laptop computers. Isometric joysticks accept force as input, and the force input sensed by the joystick is often used to control a display cursor. Applying a static force (a force with unchanging magnitude and direction) to a typical isometric joystick causes the cursor to move at a constant rate. This is even though the force vector has not changed in magnitude or direction.

In contrast, a common non-rate-type input device is a trackball usable with laptop computers. With a typical computer trackball, a constant location of input results in no movement of a display cursor. Thus, a non-rate type adjustment is an adjustment that corresponds directly to an input variable. For example, if the input variable is motion, then when the object moves, adjustment occurs; however, if the object ceases moving, adjustment ceases. Another example of a device that uses non-rate type adjustment is an ordinary computer mouse. When a typical computer mouse moves, a corresponding cursor motion is generated. When the mouse stops moving, the cursor stops moving.

With this definition of a rate type adjustment in mind, it should be noted that the step of applying the first rate can be performed in a variety of different ways. For example, the sensor can be configured to apply the first rate by repeatedly indicating a quantity of adjustment. The quantity of adjustment would be in an absolute amount form, and not be in a rate-type format. Here, the rate of change to the parameter is implemented not by a processing element downstream of the processing system that is tied to the parameter, but by the processing system itself. For example, a rate of N per second can be implemented by the processing system generating the value N once per second, by the processing system generating the value 1 N times per second, and the like. In contrast, in a configuration where the rate is provided by the processing system to something downstream from it, the processing system can provide a single N and not provide any further indicia until there is a change in rate, or continuously provide N to indicate no change in the rate.

In another variation, the sensor can be adapted to determine the rate of adjustment based on one or more ranges of measurements. For example, the sensor can be configured to define a range of measurements and generate the rate of adjustment differently based on whether or not the objects are within or outside the range of measurements.

Turning now to FIGS. 15-17, a sensor 900 is illustrated that includes a sensing region 902. Inside the sensing region is illustrated the presence of two objects 40 and 42. In FIG. 15, the objects 40 and 42 are at a first location and a second location respectively. Also illustrated in FIG. 15 is an exemplary threshold distance D1 in the sensing region, which will be used to illustrate an example of how objects can have a distance less than or greater than a threshold distance. As shown in FIG. 15, at the initial first location and second location, the objects have a distance that is less than a threshold distance D1 (shown bounding objects 40 and 42 in FIG.

15 for convenience of comparison). The sensor 900 can be configured such that motion inside the threshold distance D1 results in non-rate-type adjustment. Conversely, when the objects are separated beyond the threshold distance D1, as illustrated in FIG. 16, the sensor can apply a rate-type adjustment to the parameter, such that adjustment continues even if object motion ceases. Thus, in this embodiment, if motion were to cease while the distance between objects was less than D1, then adjustment would cease accordingly. However, if the motion were to cease while the distance between objects was greater than D1, then continued adjustment would occur at a rate determined at least in part by the distance of separation even though no relative motion was occurring.

Such threshold distances can also be used to determine the rate of adjustment. Specifically, the sensor can be configured to determine a first rate of adjustment by defining a first range of distances and determining the first rate responsive to the distance being in the first range. The rate can be the same first rate for all distances within the first range (i.e. a static rate for all distances within the first range), the rate may vary in discrete steps (i.e. a set of different constant rates for different portions of the first range), or continuously with the distance. It is understood that continuous variation may be implemented in a quantized manner due to the nature of digital systems. The range can be static, user selectable and changeable, or dynamically changeable with use. Dynamic ranges can be based off of one or more previous inputs or measurements, such as locations of the first and second objects at or near arrival in the sensing region, estimated "touchdown" locations for sensors having touch surfaces, or locations where the first and second objects had been substantially still. It should also be noted that the range can be open ended, with only an upper or lower bound, or closed, with both upper and lower bounds.

The range of measurements used for such behavior can be implemented to have a certain amount of hysteresis. For example, the threshold measurement used to transition from non-rate type to rate-type adjustment behavior can be greater or less than the threshold measurement used to transition back to non-rate type adjustment. This is illustrated in FIG. 17 compared to FIG. 15, which shows a second exemplary threshold distance D2 in the sensing region that is less than D1. The system behavior would transition from rate-type adjustment (e.g. back to non-rate type adjustment or no adjustment) if the distance between the objects decreases below D2. Hysteresis is useful for "debouncing" user input much like "debouncing" switches. Specifically, hysteresis reduces the likelihood of an input being of a value where small changes would shift the input between two ranges. With hysteresis, small variations in the input (e.g., due to noise, environmental factors, user tremors, etc.) would typically not cause the output to transition repeatedly between rate-type and non rate-type adjustments.

It should be noted that while these thresholds are illustrated in FIGS. 15-17 in the form of distances between objects, they can similarly be implemented for the rotation type embodiments. In that case, the range of measurements would often be in the form of angles or directions, such that behavior would change when an angle or direction was reached.

Furthermore, these ranges of measurements and thresholds can be determined statically, or they can be adjusted dynamically during operation. For example, the threshold distance D1 can be determined based on an initial distance between the objects 40 and 42. In that case, the initial distance can be defined by the locations at a particular point in time, such as when the objects first touch a surface associated with the sensing region. In some embodiments, the initial distance will determine the ranges of distances associated with rate-type, non-rate-type, and combined-rate-plus-non-rate-type adjustment. Analogs to these are readily available for the rotation type embodiments, as examples of measurements available include both distances and directions. In some cases, the ranges of measurements would be user definable such that a user can select absolute threshold values or relative changes in values (e.g., relative to the initial value) at which the behavior of the system changes.

Finally, in some embodiments, multiple different ranges of measurements can be defined to control various different behaviors. These ranges can be independent, or can overlap as needed. In any case, the behavior of the proximity sensor device is determined by the locations of the objects and whether or not such objects have a measurement that is within or outside the appropriate range.

Furthermore, the range of measurements can be used to implement different ways of calculating the rate of continuing adjustment. The sensor can be implemented such that the rate of adjustment changes more per unit measurement when inside a range and the rate of adjustment changes less per unit measurement when outside the range.

As another variation, where the processing system is configured to determine a first rate by determining the first rate responsive to the measurement being in a first range, the processing system can be further configured to provide a non-rate type adjustment. For example, the processing system can be further configured to determine a quantity of adjustment responsive to the measurement being in a second range different from the first range, where the quantity of adjustment is based on a difference between the measurement and a prior measurement, and provide the quantity for adjusting the parameter. Here, the prior measurement can be immediately previous, or recently previous within a relatively short span of time. This quantity of adjustment can be in place of any adjustment rate that would have otherwise been used. This quantity of adjustment can also be applied in addition to any adjustment rate provided to produce a combined, superimposed change in the parameter.

The processing system can also be configured to determine a first rate based on which range of measurements the measurement is in. For example, the processing system can be configured to determine the first rate by determining a value of the first rate for increasing the parameter responsive to the measurement being in a first range of measurements, and determining a value of the first rate for decreasing the parameter responsive to the measurement being in a second range of measurements different from the first range of measurements. Such a system can be further augmented by configuring the processing system to determine a quantity of adjustment responsive to the measurement being in a third range of measurements different from the first and second ranges, where the quantity of adjustment is based on a difference between the measurement and a prior measurement between a prior location of the first object and a prior location of the second object, and provide the quantity for adjusting the parameter. This quantity of adjustment can be in place of any adjustment rate that would have otherwise been provided, or be applied in addition to any adjustment rate provided. The third range may overlap one or both the first and second ranges, abut one or both the first and second ranges, or be separated from the first and second ranges by a span of values.

In specific ones of the embodiments discussed above, the system can be configured to use distance as the measurement. In such an embodiment, the processing system may be configured to provide a rate-type adjustment by repeatedly causing a same, non-zero quantity of adjustment responsive to the distance being substantially the same as an immediately previous distance, where the previous distance is between an immediately prior position of a first object and an immediately prior position of the second object. Likewise, the processing system can be configured to cause a rate-type adjustment having an amount related to a direction instead of distance.

In other variations, the processing system can be configured to cause a rate-type adjustment having an amount proportional to a difference between a value of the present vector and a reference value. The processing system can be configured such that the value of the present vector is one of a length of the present vector and an angle between the present vector and a reference.

Likewise, the processing system can be further configured to vary the amount of rate-type adjustment responsive to a change in an interaction extent between the first and second objects and the sensor. The interaction extent can be a force associated with the first and second objects, an amount of capacitive coupling (or change in capacitive coupling) due to the first and second objects, a duration of time that the first and second objects have had positions connectable by vectors having values above a reference value, and any of a number of interaction characteristics associated with the first and second objects.

Turning now to FIG. 18, another embodiment of the sensor 900 is illustrated. In this embodiment, the sensing region 902 includes a defined outer portion 904. The outer portion 904 can provide a variety of functionality. For example, it can be used to generate and apply a second rate of adjustment to a parameter when at least one of the objects moves into or out of the portion 904. This second rate can coexist with a first rate of adjustment that is based on measurements. For example, superimposing the first rate over the second rate in a direct relationship or with some mathematical weighting are different methods of combining the first and second rates. This superposition of rates can result in a strengthening of the overall rate, or they can cancel and override each other. Whether or not the rates cancel each other, in this specific example, the combination of both the first and second rates is applied when such criteria are met.

In another embodiment, the outer portion 904 can be used to generate a rate of adjustment whenever one of the two objects is in the outer region, independently of any other such continuing adjustment available on the device. In this embodiment, the outer portion 904 provides an independent mechanism for a user to initiate a continuing rate-type adjustment that continues even when object motion ceases.

Specifically, the processing system associated with sensor 900 can provide a quantity of adjustment responsive to object motion of one of the objects in the sensing region. This quantity of adjustment would be based on the difference between a current measurement and a prior measurement, and would provide a non-rate-type adjustment. Then, the processing system can provide a rate-type adjustment in response to one or more of the objects being moved into the outer portion 904. Some embodiments may respond only if a specific one of the objects being moved into the outer portion 904, some embodiments may respond to either of the objects being moved into the outer portion 904, and some embodiments may require two or more objects in the outer portion 904. Thus, the proximity sensor device containing sensor 900 facilitates, in one input device, both a non-extended pinching or rotating function with its corresponding non-rate-type adjustment, and a continuing or extending pinching or rotating function with a corresponding rate-type adjustment.

In one embodiment with a defined outer portion 904, the processing system is configured to determine (1) a location of a first object in the sensing region, (2) a location of a second object contemporaneously in the sensing region, (3) a measurement descriptive of the location of the first object relative to the location of the second object. The processing system also determines a quantity of adjustment, responsive to the measurement differing from a prior measurement and provides non-zero quantity of adjustment for adjusting a parameter. The prior measurement is descriptive of a prior location of the first object in the sensing region relative to a prior location of the second object contemporaneously in the sensing region. The processing system is further configured to determine a rate of adjustment responsive to at least one of the first and second objects being in the outer portion 904, and provide the rate for adjusting the parameter such that the parameter adjusts even if the one or both of the first and second objects is stationary in the outer portion 904.

In other variations, the processing system can be configured to determine a first rate by determining a value for the first rate, where the value for the first rate is variable with a value of the distance. For example, the value of the first rate can be proportional to a difference between the distance and a reference. This reference can be predetermined, such as preset during design or manufacture, or be made to change dynamically. Dynamic references can be based on user selection, prior use history, initial "touchdown" or other key object locations, and the like. The reference can also be made to be an end of the first range, and such a reference would be static if the first range is made static, or dynamic if the range is made dynamic.

As mentioned above, the processing system can be configured such that the first rate also varies with a characteristic unrelated to the positions of the first and second objects. For example, the processing system can be configured to determine a first rate by taking into account factors such as the force or capacitance associated with one or more of the objects. The factors can also be combined, such as by configuring the processing system to account for both force and capacitance associated with one or more of the objects in determining the first rate. In one such embodiment, the first rate has a greater magnitude in response to a greater force (or change in capacitive coupling), and a smaller magnitude in response to a lesser force (or change in capacitive coupling). As another example, the processing system can also be configured such that the first rate is variable with a duration of time that measurements have been in a first range. In operation, allowing users to vary the rate in such manners gives users more control over the rate of adjustment.

Other embodiments of the invention allow the sensor to facilitate adjustments in different ways using the proximity sensor device. For example, although the invention has mainly been described with two input objects, other number of input objects are possible. In some embodiments, the processing system is configured to cause adjustment of different parameters depending on the number of input objects. In one embodiment, the processing system is configured to cause adjustment of a first parameter responsive to the sensor detecting two objects moving relative to each other, and cause adjustment of a second parameter responsive to the sensor detecting three objects moving relative to each other. Multiple other measurements may exist for three or more objects, and these can be averaged or simplified as appropriate. As stated above, in place of or in addition to distance between the objects, directions defined by the objects can be used.

The embodiments of the present invention thus provide an electronic system and method that facilitates improved device usability. Specifically, the device and method provide improved user interface functionality by facilitating extended parameter adjustment using proximity sensors. The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. An electronic system comprising:
    a display configured to show an image;
    a proximity sensor adapted to detect objects in a sensing region; and
    a processing system coupled to the display and the proximity sensor, the processing system configured to:
        determine a reference measurement descriptive of a reference location of a first object relative to a reference location of a second object contemporaneously in the sensing region;
        determine a measurement descriptive of a location of the first object relative to a location of the second object contemporaneously in the sensing region; and
        apply a first rate of adjustment to a parameter of the image such that the parameter adjusts even if the first object is stationary relative to the second object in the sensing region and the second object is stationary relative to the first object in the sensing region, wherein the first rate of adjustment is variable based on the measurement and the reference measurement, and wherein the first rate of adjustment is zero if the measurement and the reference measurement are equal.

2. The system of claim 1, wherein the measurement comprises a direction defined by the location of the first object and the location of the second object.

3. The system of claim 1, wherein the measurement comprises a distance defined by the location of the first object and the location of the second object.

4. The system of claim 3 wherein the processing system is further configured to:
    determine a direction defined by the location of the first object and the location of the second object; and
    apply a second rate of adjustment to a second parameter of the image such that the second parameter adjusts even if the first object is stationary relative to the second object, wherein the second rate of adjustment is based on the direction.

5. The system of claim 4, wherein the processing system is further configured to:
    determine a reference direction based on the reference location of the first object and the reference location of the second object, wherein the second rate is zero if the direction is equal to the reference direction.

6. The system of claim 1, wherein the processing system is configured to apply the first rate of adjustment to the parameter by:
    defining a first range of measurements, the first range having hysteresis such that the first range defined in response to the measurement being in the first range is larger than the first range defined in response to the measurement being outside the first range; and
    utilizing the first rate to adjust the parameter responsive to the measurement being in the first range.

7. The system of claim 1, wherein the reference location of the first object is an initial location of the first object and the reference location of the second object is an initial location of the second object.

8. The system of claim 1, wherein
    the processing system is further configured to:
        define a first range based on the reference measurement;
        utilize the first rate to adjust the parameter responsive to the measurement being inside the first range; and
        apply a quantity of adjustment to the parameter responsive to the measurement being in a second range different from the first range, wherein the quantity of adjustment is based on a difference between the measurement and a prior measurement, and wherein the prior measurement is defined by a prior location of the first object and a prior location of the second object.

9. The system of claim 1, wherein the first rate is based on a difference between the measurement and the reference measurement.

10. The system of claim 1, wherein the first rate of adjustment is variable based on the measurement and the reference measurement responsive to the measurement being in a first range and wherein the first rate of adjustment is static responsive to the measurement being outside the first range.

11. The system of claim 1, wherein the processing system is configured to apply the first rate of adjustment to the parameter by:
    applying the first rate based on the measurement and at least one characteristic selected from the set consisting of: a force associated with the first and second objects, a capacitance associated with the first and second objects, and a duration of time that measurements descriptive of locations of the first object relative to respective contemporaneous locations of a second object have been in a first range.

12. The system of claim 1, wherein the processing system is further configured to:
    cease adjustment of the parameter responsive to at least one of the first and second objects exiting the sensing region.

13. The system of claim 1, wherein the processing system is further configured to:
    cease applying the first rate of adjustment to the parameter responsive to a reversal of motion of the second object relative to the first object.

14. A method of adjusting a parameter using a proximity sensor adapted to detect objects in a sensing region, the method comprising:
    determining a reference measurement descriptive of a reference location of a first object relative to a reference location of a second object contemporaneously in the sensing region;
    determining a measurement descriptive of a location of the first object relative to a location of the second object contemporaneously in the sensing region; and
    providing a first rate of adjustment for adjusting a parameter such that the parameter adjusts even if the first object is stationary relative to the second object in the sensing region and the second object is stationary relative to the first object in the sensing region, wherein the first rate of adjustment is variable based on the measurement and the reference measurement, and wherein the first rate of adjustment is zero if the measurement and the reference measurement are equal.

15. The method of claim 14, wherein determining a measurement comprises:
   determining at least one of a direction and a distance based on the location of the first object and the location of the second object.

16. The method of claim 14, further comprising:
   providing an indication to cease adjustment of the parameter responsive to at least one of the first and second objects moving away from the sensing region.

17. The method of claim 14, wherein the measurement comprises a distance defined by the location of the first object and the location of the second object, and wherein the method further comprises:
   determining a direction defined by the location of the first object and the location of the second object; and
   applying a second rate of adjustment to a second parameter such that the second parameter adjusts even if the first object is stationary relative to the second object, wherein the second rate of adjustment is based on the direction.

18. The method of claim 14, wherein providing the first rate of adjustment comprises:
   defining a first range of measurements, the first range having hysteresis such that the first range defined in response to the measurement being in the first range is larger than the first range defined in response to the measurement being outside the first range; and
   indicating the first rate responsive to the measurement being in the first range.

19. The method of claim 14 wherein the reference location of the first object is an initial location of the first object and wherein the reference location of the second object is an initial location of the second object.

20. The method of claim 14, further comprising
   defining a first range based on the reference measurement;
   utilizing the first rate to adjust the parameter responsive to the measurement being inside the first range; and
   providing a quantity of adjustment for adjusting the parameter responsive to the measurement being in a second range different from the first range, wherein the quantity of adjustment is based on a difference between the measurement and a prior measurement, wherein the prior measurement is defined by a prior location of the first object and a prior location of the second object.

21. The method of claim 14 wherein the first rate of adjustment is variable based on the measurement and the reference measurement responsive to the measurement being in a first range and wherein the first rate of adjustment is static responsive to the measurement being outside the first range.

22. The method of claim 14, wherein providing the first rate of adjustment comprises:
   indicating the first rate based on the measurement and at least one characteristic selected from the set consisting of: a force associated with the first and second objects, a capacitance associated with the first and second objects, and a duration of time that measurements descriptive of locations of the first object relative to respective contemporaneous locations of the second object have been in a first range.

23. The method of claim 14, wherein providing the first rate of adjustment comprises:
   repeatedly indicating an amount of adjustment.

24. The method claim 14, further comprising:
   ceasing adjustment responsive to a reversal of motion of the second object relative to the first object.

25. A program product comprising:
   a) a proximity sensor program, the proximity sensor program executable by a computing system to:
      determine a reference measurement descriptive of a reference location of a first object relative to a reference location of a second object contemporaneously in a sensing region;
      determine a measurement descriptive of a location of the first object relative to a location of the second object contemporaneously in the sensing region,
      determine a first rate of adjustment, the first rate of adjustment variable based on the measurement and the reference measurement, wherein the first rate is zero if the measurement and the reference measurement are equal; and
      apply the first rate of adjustment to a parameter such that the parameter adjusts even if the first object is stationary relative to the second object in the sensing region and the second object is stationary relative to the first object in the sensing region; and
   b) non-transitory computer-readable media bearing said proximity sensor program.

26. A proximity sensor device comprising:
   a processing system configured to couple to a sensor adapted to detect objects in a sensing region, the processing system configured to:
      determine a reference distance between a reference location of a first object and a reference location of a second object contemporaneously in the sensing region;
      determine a distance between a location of the first object and a location of the second object contemporaneously in the sensing region; and
      provide a first rate for adjusting a visual parameter such that the visual parameter adjusts even if the first object is stationary relative to the second object and the second object is stationary relative to the first object, wherein the first rate is variable based on the distance and the reference distance, and wherein the first rate is zero if the distance and the reference distance are equal.

27. The device of claim 26 wherein the reference location of the first object is an initial location of the first object and the reference location of the second object is an initial location of the second object, and wherein the processing system is configured to apply a first rate of adjustment to a parameter by:
   defining a first range of distances, the first range having hysteresis such that the first range defined in response to the distance being in the first range is larger than the first range defined in response to the distance being outside the first range; and
   utilizing the first rate to adjust the parameter responsive to the distance being in the first range.

28. The device of claim 26 wherein the visual parameter is a magnification level, wherein the first rate is configured to increase the visual parameter in response to the distance being in a first range of distances, wherein the first rate is configured to decrease the visual parameter in response to the distance being in a second range of distances, and wherein the processing system is further configured to:
   determine a quantity of adjustment responsive to the distance being in a third range different from the first and second ranges, wherein the quantity of adjustment is based on a difference between the distance and a prior distance, and wherein the prior distance is defined by a prior location of the first object and a prior location of the second object; and indicate the quantity of adjustment for adjusting the visual parameter.

29. A proximity sensor device comprising:
a processing system configured to couple to a sensor adapted to detect objects in a sensing region, the processing system configured to:
- determine a reference direction using a reference location of a first object and a reference location of a second object contemporaneously in a sensing region;
- determine a direction defined by a location of the first object and a location of the second object contemporaneously in the sensing region; and
- provide a first rate for adjusting a visual parameter such that the visual parameter adjusts even if the first object is stationary relative to the second object and the second object is stationary relative to the first object, wherein the first rate is variable based on the direction and the reference direction, and wherein the first rate is zero if the direction and the reference direction are the same.

30. The device of claim 29 wherein the reference location of the first object is an initial location of the first object and the reference location of the second object is an initial location of the second object, and wherein the processing system is configured to apply a first rate of adjustment to a parameter by:
- defining a first range of directions, the first range having hysteresis such that the first range defined in response to the direction being in the first range is larger than the first range defined in response to the direction being outside the first range; and
- utilizing the first rate to adjust the parameter responsive to the direction being in the first range.

31. The device of claim 29 wherein the visual parameter is rotation angle, wherein the first rate is configured to increase the visual parameter in response to the direction being in a first range of directions, wherein the first rate is configured to decrease the visual parameter in response to the direction being in a second range of directions, and wherein the processing system is further configured to:
- determine a quantity of adjustment responsive to the direction being in a third range of directions different from the first and second ranges, wherein the quantity of adjustment is based on a difference between the direction and a prior direction, and wherein the prior direction is defined by a prior location of the first object and a prior location of the second object; and
- indicate the quantity of adjustment for adjusting the visual parameter.

32. A proximity sensor device comprising:
a sensor adapted to detect objects in a sensing region; and
a processing system coupled to the sensor, the processing system configured to:
- determine a location of a first object in the sensing region;
- determine a location of a second object contemporaneously in the sensing region,
- determine a measurement descriptive of the location of the first object relative to the location of the second object;
- determine a quantity of adjustment responsive to the measurement differing from a prior measurement, wherein the prior measurement is descriptive of a prior location of the first object in the sensing region relative to a prior location of the second object contemporaneously in the sensing region;
- indicate the quantity of adjustment for adjusting a parameter;
- determine a rate of adjustment responsive to at least one of the first and second objects being in an outer portion of the sensing region, the rate of adjustment variable based on the quantity of adjustment; and
- indicate the rate for adjusting the parameter such that the parameter adjusts even if the at least one of the first and second objects is stationary in the outer portion.

33. The device of claim 32, wherein the processing system is further configured to:
- cease adjustment responsive to a reversal of motion of the first object relative to the second object.

34. The system of claim 1, wherein the processing system is further configured to
- define a first range based on the reference measurement;
- utilize the first rate to adjust the parameter responsive to the measurement being inside the first range; and
- apply no adjustment to the parameter responsive to the measurement being in a second range different from the first range.

* * * * *